(12) United States Patent
Cardona

(10) Patent No.: US 9,295,335 B2
(45) Date of Patent: Mar. 29, 2016

(54) CONVERTIBLE DUAL PURPOSE DEVICE

(75) Inventor: James Patrick Cardona, Coolum Beach (AU)

(73) Assignees: James Patrick Cardona, Coolum Beach, QLD (AU); Trevor Raymond Clark, Woombye, QLD (AU); Guy Darren Trappett, Peregian Spring, QLD (AU); Mario Cardona, Coolum Beach, QLD (AU)

( * ) Notice: Subject to any disclaimer, the term of this patent is extended or adjusted under 35 U.S.C. 154(b) by 0 days.

(21) Appl. No.: 14/124,231

(22) PCT Filed: Jun. 7, 2012

(86) PCT No.: PCT/AU2012/000656
§ 371 (c)(1),
(2), (4) Date: Dec. 5, 2013

(87) PCT Pub. No.: WO2012/167317
PCT Pub. Date: Dec. 13, 2012

(65) Prior Publication Data
US 2014/0097649 A1    Apr. 10, 2014

(30) Foreign Application Priority Data
Jun. 7, 2011    (AU) .................. 2011902234

(51) Int. Cl.
| B62B 1/20 | (2006.01) |
| A47C 13/00 | (2006.01) |
| A47C 4/52 | (2006.01) |
| A47C 4/00 | (2006.01) |
| A47C 4/28 | (2006.01) |

(52) U.S. Cl.
CPC . *A47C 13/00* (2013.01); *A47C 4/00* (2013.01); *A47C 4/28* (2013.01); *A47C 4/52* (2013.01); *B62B 1/20* (2013.01); *B62B 1/208* (2013.01); *B62B 2202/52* (2013.01); *B62B 2206/006* (2013.01)

(58) Field of Classification Search
CPC .............. A47C 4/52; A47C 4/00; A47C 4/28; B62B 1/208; B62B 1/20; B62B 2206/006; B62B 2202/52
USPC ............................ 297/188, 16.1; 280/47.31
See application file for complete search history.

(56) References Cited

U.S. PATENT DOCUMENTS

| 264,967 | A * | 9/1882 | Stevens .................... 280/47.31 |
| 913,487 | A * | 2/1909 | Fleischmann ................ 280/653 |
| 2,967,058 | A * | 1/1961 | Hoffmann, Jr. ................ 280/30 |
| 3,693,993 | A * | 9/1972 | Mazzarelli et al. ............. 280/30 |
| 3,758,128 | A * | 9/1973 | Stenwall .................... 280/47.25 |

(Continued)

*Primary Examiner* — Brodie Follman
*Assistant Examiner* — Brian Cassidy
(74) *Attorney, Agent, or Firm* — Molins & Co. Pty. Ltd.

(57) ABSTRACT

A convertible dual purpose device (10) has a frame (12) movable between an expanded configuration and a collapsed configuration, supporting material (28) connected to the frame for supporting one or more objects, handles (14, 16, 18, 20) at a first end of the frame, and a wheel (26) at a second end of the frame. When the frame is in the expanded configuration, the device can be positioned in a first orientation whereby the supporting material is adapted to serve as a load support for a chair, or in a second orientation whereby the supporting material is adapted to serve as a load support for a wheel barrow. When the frame is in the collapsed configuration, the device can be stored in a carry bag (42).

6 Claims, 15 Drawing Sheets

(56) References Cited

U.S. PATENT DOCUMENTS

| | | | | |
|---|---|---|---|---|
| 3,826,511 A | * | 7/1974 | Frank | 280/653 |
| 4,645,262 A | * | 2/1987 | Furubotten | 297/129 |
| 5,040,807 A | * | 8/1991 | Snover | 280/30 |
| 5,423,592 A | * | 6/1995 | Spurrier et al. | 297/129 |
| 6,869,098 B2 | * | 3/2005 | Tomchak et al. | 280/653 |

* cited by examiner

CONVERTIBLE DUAL PURPOSE DEVICE

TECHNICAL FIELD

The present invention relates to a convertible dual purpose device and, in particular, to a compact, portable and collapsible device that is able to convert between a chair and a wheel barrow for outdoor recreational use.

Although the background, objects and preferred embodiments of the invention will be hereinafter described with reference to a convertible dual purpose device for outdoor recreational use, such as picnics, barbeques and watching sports events k parks, it is to be understood that the invention is not limited thereto but has wider application. For example, the convertible dual purpose device may be used for domestic purposes (eg. in the home) or for commercial purposes (eg. at market stalls).

It is to be understood that the terminology employed herein is for the purpose of description only and should not be regarded as limiting. For instance, the terms "comprising" or "comprises" are to be understood as meaning "including", unless otherwise stated. Also, the term "wheel barrow" is to be understood as including any wheeled carrier, whether or not it is "barrow-like", that can be pushed and stably carry objects that would normally be heavy or difficult to carry by hand.

BACKGROUND ART

Many outdoor recreational events involve people bringing their own food, drinks, chairs and other items designed for their enjoyment. However, such items are normally carried to the intended site of the event (usually after being unloaded from a vehicle) by hand, and this can be laborious and time consuming, especially if there is only one person to carry the items. Although the carrying of chairs can be made easier by their collapsible nature, and drinks may be packaged together or assembled in an ESKY™ or other portable container, these items can at best be carried by a single person two at a time.

Food is even more troublesome, especially if it is provided on plates or other serving utensils, because of the need to maintain it in a condition where it looks and tastes acceptable to others.

It has been found by the present inventor that these problems can be overcome by providing a convertible dual purpose device that is able to easily convert between a chair and a wheel barrow for outdoor recreational use.

It has also been found by the present inventor that such a device can be best achieved by providing a compact, portable and collapsible wheeled carrier that can be pushed and stably carry objects that would normally be heavy or difficult to carry by hand.

DISCLOSURE OF INVENTION

It is, therefore, an object of the present invention to overcome or substantially ameliorate the disadvantages and problems of the aforementioned prior art, or at least provide a useful alternative.

It has been found by the present inventor that these and other objects of the invention may be achieved in general by providing a convertible dual purpose device comprising:
 (a) a frame movable between an expanded configuration and a collapsed configuration,
 (b) supporting means connected to the frame for supporting one or more objects,
 (c) handle means at a first end of the frame, and
 (d) wheel means at a second end of the frame,
wherein, when the frame is in the expanded configuration, the device can be positioned in a first orientation whereby the supporting means is adapted to serve as a load support for a chair, or in a second orientation whereby the supporting means is adapted to serve as a load support for a wheel barrow, and wherein, when the frame is in the collapsed configuration, the device can be stored in a carry bag.

Preferably, the supporting means comprises flexible and load bearing material that, when the device is in the first orientation, comfortably supports the weight of a person, and when the device is in the second orientation, stably supports the weight of the one or more objects when being pushed.

It is preferred that the wheel means comprises a single wheel which is located posteriorly of a region of the supporting means adapted to support the torso of a person when the device is positioned in the first orientation.

It is also preferred that the handle means comprises a pair of spaced apart handles, each handle being located at the end of respective handle frame members which converge in the direction of the second end of the frame.

In a preferred form, the handles act as ground engaging feet when the device is positioned in the first orientation.

The handle frame members are preferably pivotable with respect to a main portion of the frame when the frame is being moved between an expanded configuration and a collapsed configuration.

There has been thus outlined, rather broadly, the more important features of the invention in order that the detailed description thereof that follows may be better understood and put into practical effect, and in order that the present contribution to the art may be better appreciated.

There are additional features of the invention that will be described hereinafter. As such, those skilled in the art will appreciate that the conception, upon which the disclosure is based, may be readily utilized as the basis for designing other devices and processes for carrying out the objects of the present invention. It is important, therefore, that the broad outline of the invention described above be regarded as including such equivalent constructions in so far as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the accompanying drawings, in which.

MODES FOR CARRYING OUT THE INVENTION

Figure 1:
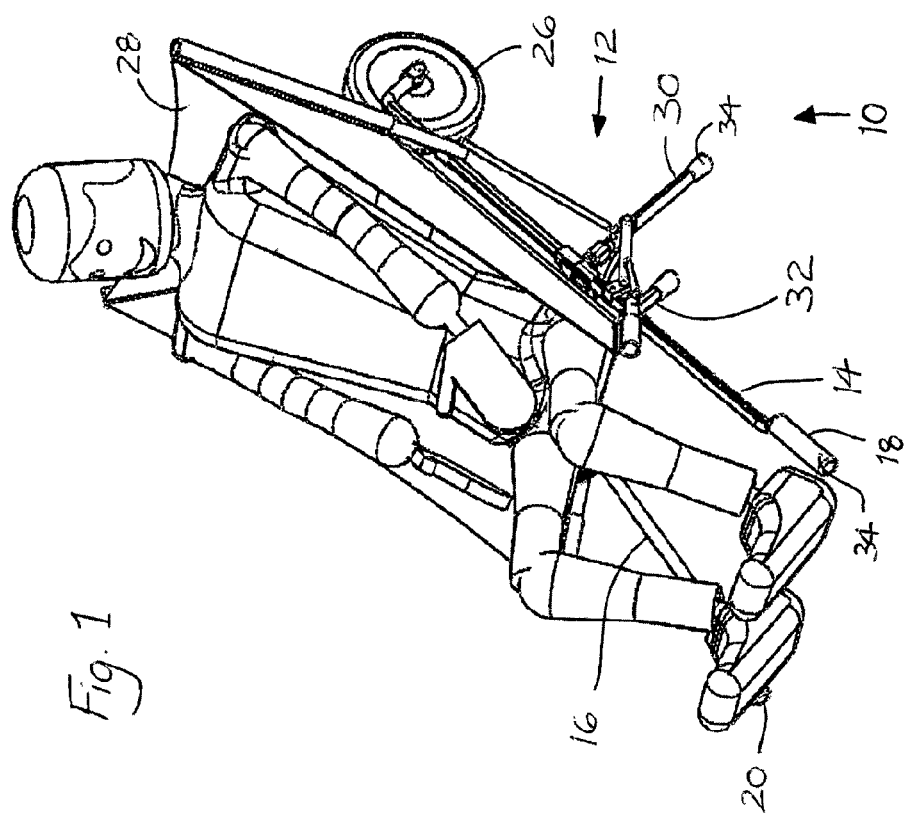
FIG. 1 is a perspective view of a convertible dual purpose device according to a preferred embodiment of the invention, when the frame is in the expanded configuration, and the device is positioned in the first orientation whereby the supporting means can serve as a load support for a chair, with a person (shown schematically) seated upon the so formed chair.

With reference now to the above summarized drawings, a convertible dual purpose device embodying the principles and concepts of the present invention and generally designated by the reference numeral 10 will now be described.

The convertible dual purpose device 10 is compact, portable and collapsible, and is able to convert between a chair and a wheel barrow for outdoor recreational use.

The device 10 has an articulated frame 12 that is movable between an expanded configuration and a collapsed configuration. The frame 12 comprises a plurality of frame members that are connected together by a plurality of pivoting joints.

When the frame 12 is in the expanded configuration, there is a pair of converging handle frame members 14, 16 having respective handles 18, 20 located at a first end thereof. There is also a pair of main body frame members 22, 24 for supporting a wheel 26 at a second end of the frame.

When the device 10 is positioned in the first orientation (see FIG. 1), the supporting material 28 can serve as a load support for a chair, with the handles 18, 20 acting as ground engaging feet at the front of the chair. The wheel 26 is located posteriorly of a region of the supporting material 28 adapted to support the torso of a person when the device 10 is positioned in the first orientation. A pair of shorter leg frame members 30, 32 engages the ground at the rear of the chair. Moulded rubber sleeves 34 cover the handles 18, 20 and the free ends of the ground engaging leg frame members 30, 32.

Figure 2:
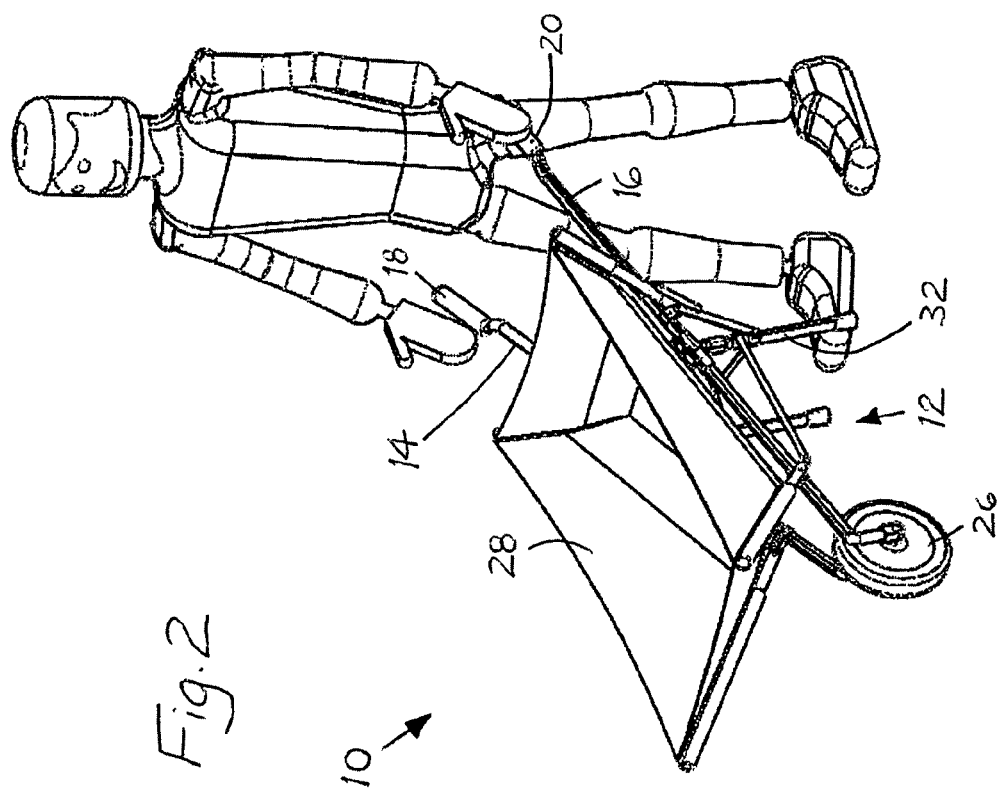
FIG. 2 is a perspective view of the convertible dual purpose device of FIG. 1, when the frame is in the expanded configuration, and the device is positioned in the second orientation whereby the supporting means can serve as a load support for a wheel barrow, with a person (shown schematically) pushing the so formed wheel barrow.
Figure 3:
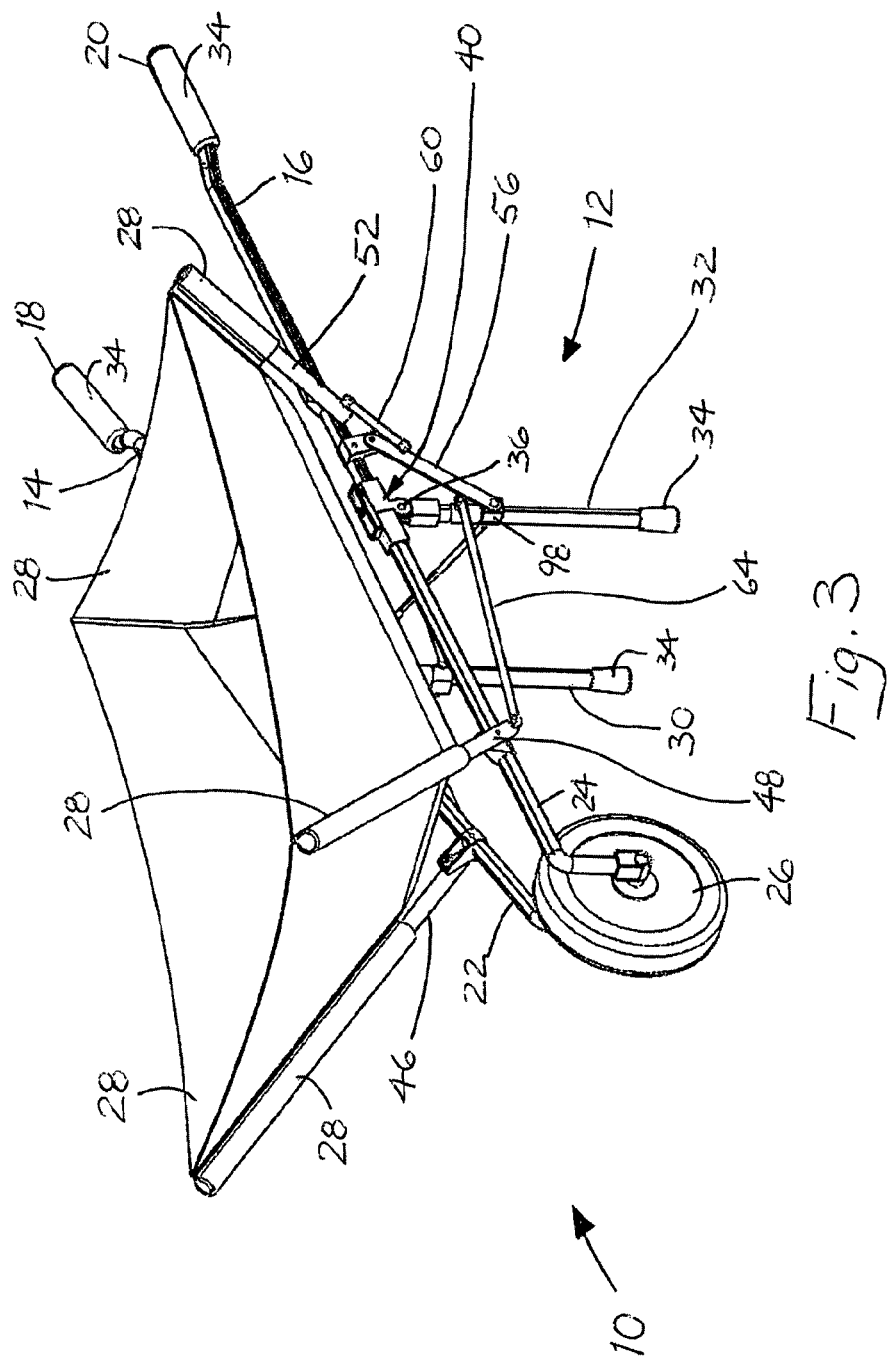
FIG. 3 is a perspective view of the device of FIG. 2 showing the so formed wheel barrow in a resting position.

When the device 10 is positioned in the second orientation (see FIGS. 2, 3 and 4), the supporting material 28 can serve as a load support for a wheel barrow, with the wheel. 26 engaging the ground and the device 10 able to be pushed by a person gripping the handles 18, 20. The wheel 26 has a diameter of about 200 mm, but may be of any desired diameter suited for allowing the wheel to work on a variety of terrain, including rocky ground and long grass.

The handle frame members 14, 16 are pivotable with respect to a main portion of the frame 12. Specifically, each handle frame member 14, 16 can pivot downwardly about a pivoting joint 34, 36 when a co-operating latch arrangement 38, 40 is in an unlocked condition so as to allow the device 10 to be collapsed to a collapsed configuration.

The supporting material 28 is a flexible and load bearing material that, when the device 10 is in the first orientation, comfortably supports the weight of a person, and when the device 10 is in the second orientation, stably supports the weight of the one or more objects when being pushed. These objects may comprise food, drinks and other items, such as containers for these objects.

The flexible and load bearing material 28 may include cushioning and padding in the head support and buttock support regions.

When the device 10 is positioned in the first orientation, and the supporting material 28 is serving as a load support for a chair, the buttock support region is about 500 mm above the ground.

The collapsing of the device 10, whereby the frame 12 moves from an expanded configuration to a collapsed configuration, will now be described in greater detail by reference to FIGS. 4 to 14 which show only the frame, handle means and wheel means (but not the supporting means) of the wheel barrow. The supporting means has been omitted from these drawings for ease of description of the collapsing process, although it is to be understood that the supporting means will normally remain connected to the frame and will collapse along with the frame.

Figure 4:
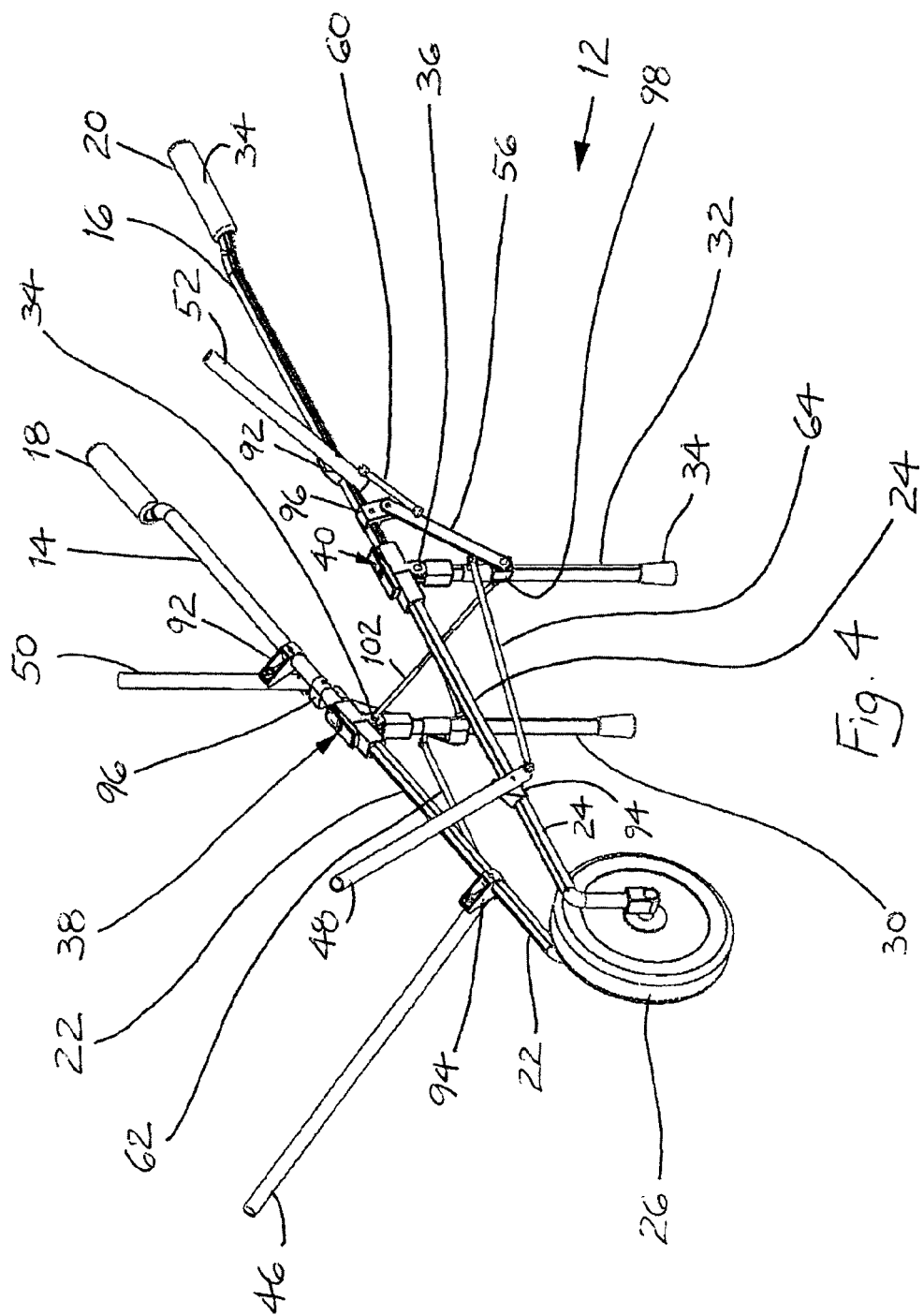
FIG. 4 is a perspective view of only the frame, handle means and wheel means (but not the supporting means) of the wheel barrow shown in FIG. 3.
Figure 5:
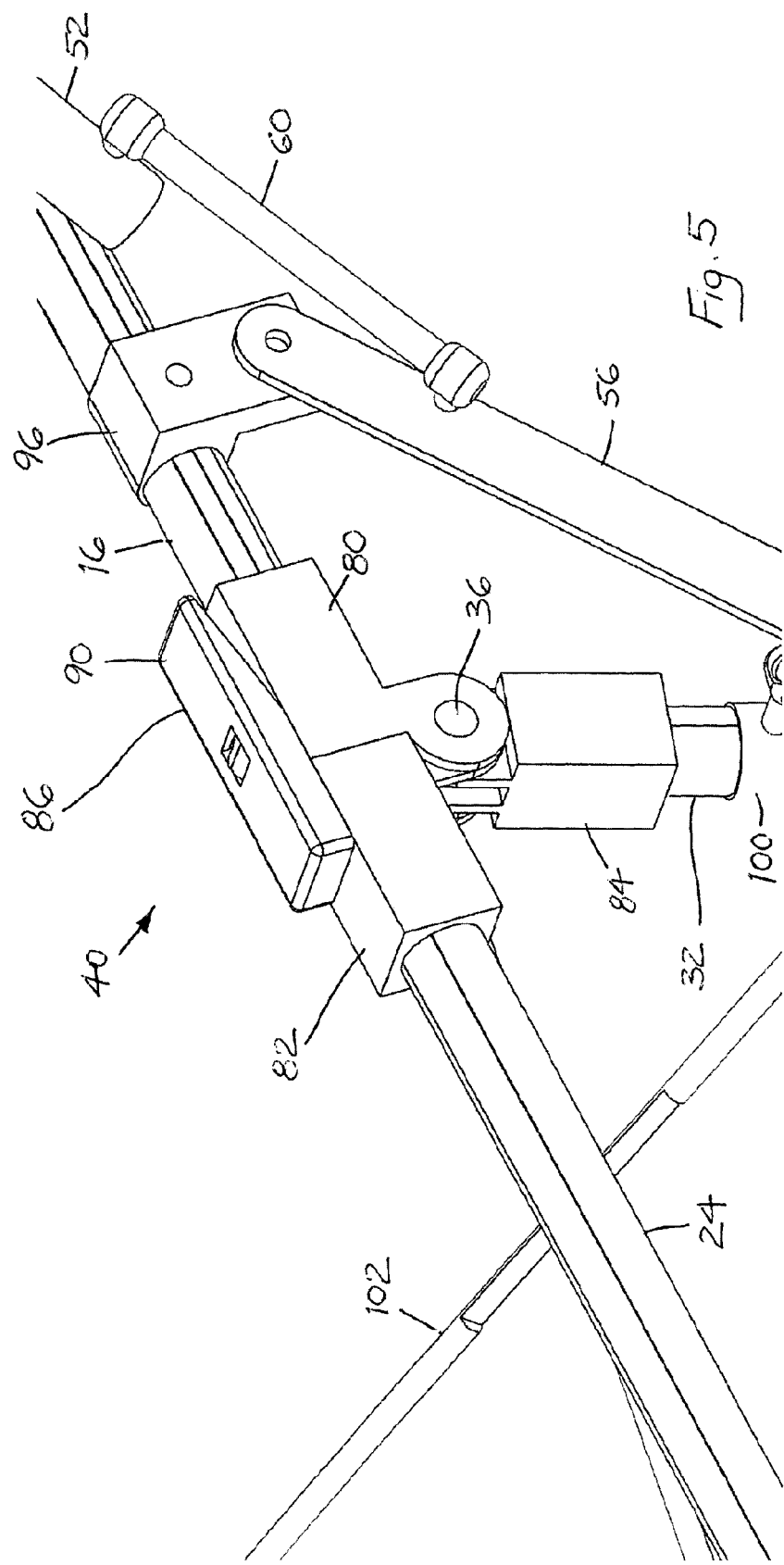
FIG. 5 is an enlarged perspective view of a portion of the frame shown in FIG. 4 showing a latch arrangement in a locked condition that prevents the frame being moved from an expanded configuration to a collapsed configuration.
Figure 6:
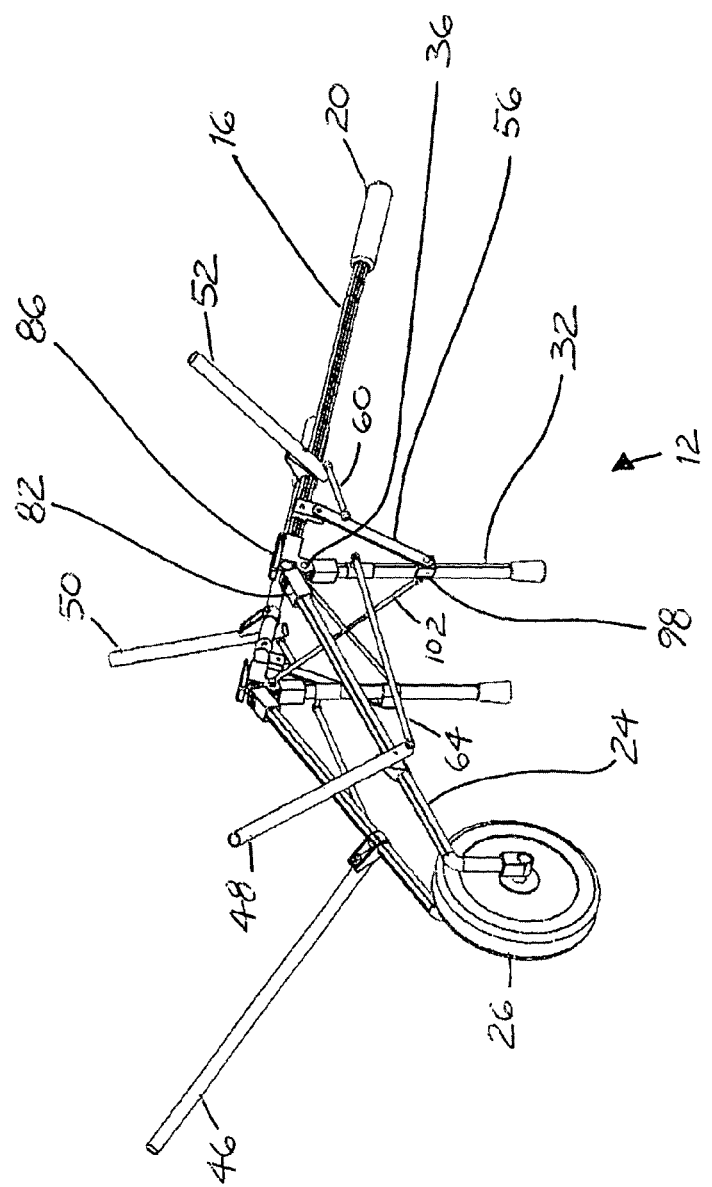
FIG. 6 is a perspective view similar to that of FIG. 4 but showing the frame, handle means and wheel means in a first state of being collapsed to a collapsed configuration.
Figure 7:
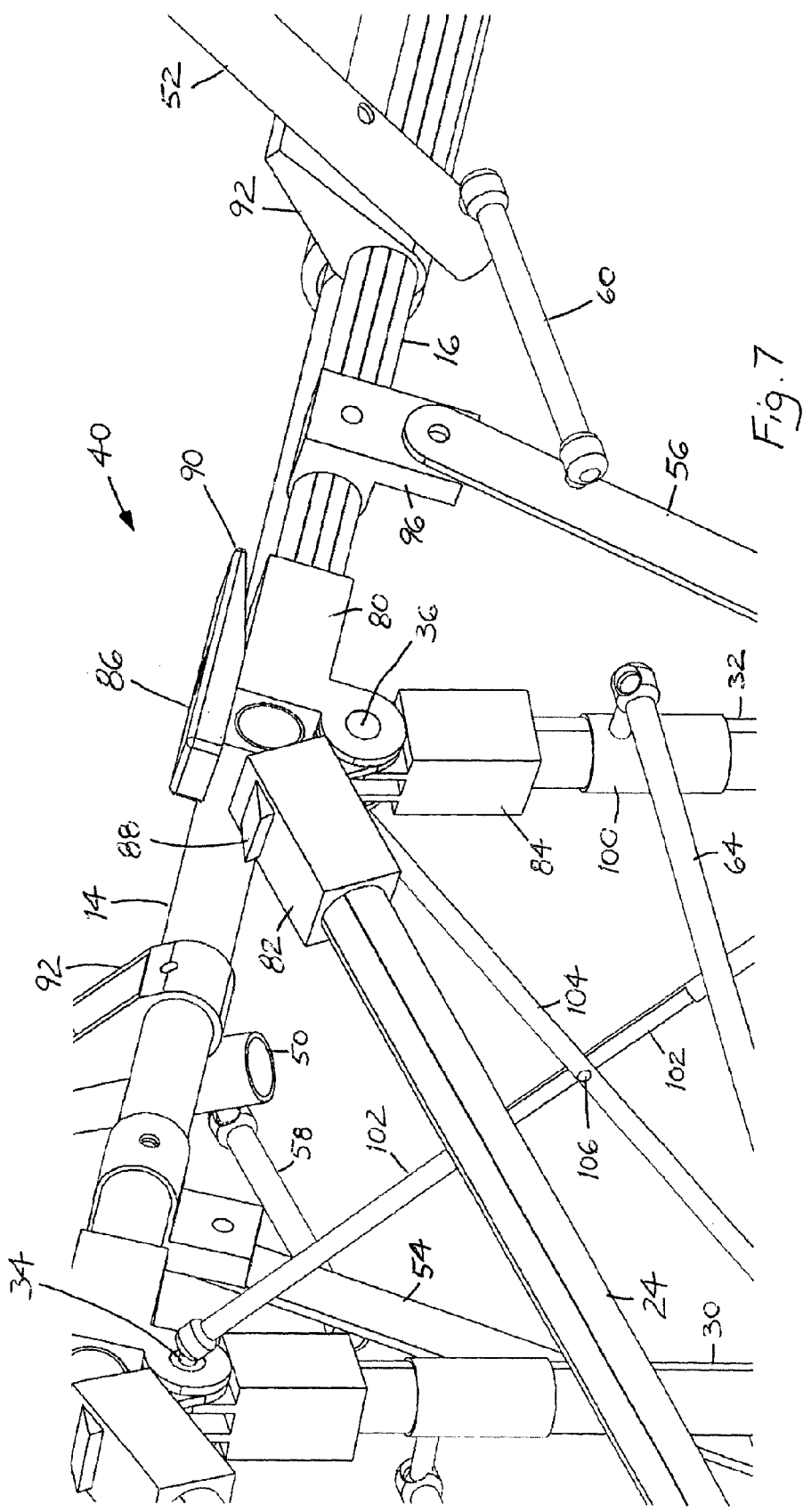
FIG. 7 is an enlarged perspective view of the frame portion shown in FIG. 5, but showing the latch arrangement in an unlocked condition that allows the frame, handle means and wheel means to be collapsed to the first state shown in FIG. 6.
Figure 8:
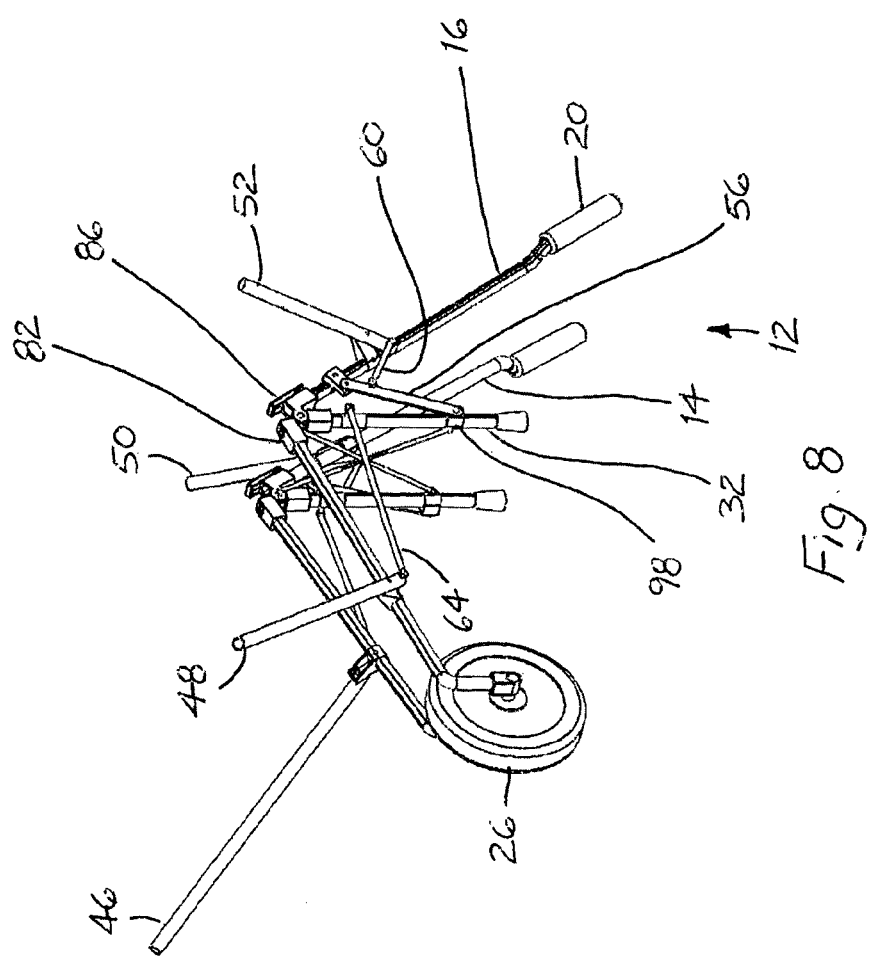
FIG. 8 is a perspective view similar to that of FIG. 6 but showing the frame, handle means and wheel means in a second state of being collapsed to a collapsed configuration.

The expanded configuration of the frame 12 shown in FIG. 4 is locked by a pair of identically structured and operating latch arrangements 38, 40. Accordingly, only the operation of latch arrangement 40 will be described. The latch arrangement 40 co-operates with a pivoting joint 36 at a junction of the handle frame member 16, main body frame member 24 and leg frame member 32. At that junction, shown in close up detail in FIG. 5, there is a handle frame bracket 80, a body frame bracket 82 and a leg frame bracket 84. The latch arrangement 40 comprises a latch lever 86 pivotally mounted on the handle frame bracket 80, and a catch 88 (see FIG. 7) secured on the body frame bracket 82. The latch lever 86 may be spring mounted. The pivoting joint 36 is connected to each of the brackets 80, 82 and 84 and allows the brackets to pivot relative to each other when the latch arrangement 40 is in an unlocked condition. The latch arrangement can be unlocked by a user pressing down on the tapered end 90 of the lever latch 86 so as to cause the opposite end of the lever latch 86 to pivot upwardly and disengage the catch 88.

When both of the latch arrangements 38, 40 are in an unlocked condition, the handle frame members 14, 16 are pivoted downwardly towards their respective adjacent leg frame member 30, 32.

Pivotally mounted, via a bracket 92, to each handle frame member 14, 16 is a rear support frame member 50, 52, and pivotally mounted, via a bracket 94, to each main body frame member 22, 24 is a front support frame member 46, 48. The frame members 50, 52, 46 and 48 are adapted to engage looped or tube-like formations of the supporting material 28 in the manner shown in FIG. 3. Also pivotally mounted, via a bracket 96, to each handle frame member 14, 16 is a slide frame member 54, 56.

As the structures and operation of the left and right sides of the device 10 (when viewed from the second end of the frame 12) are identical, only the structures and operation of the frame members of the right side of the device will be described.

A rear linkage frame member 60 pivotally links a bottom end of the rear support frame member 52 with the slide frame member 56. The bottom end of the slide frame member 56 is pivotally mounted to a sleeve 98 which can slide along the leg frame member 32. A front linkage frame member 64 pivotally links a bottom end of the front support frame member 48 with a sleeve 100 mounted to the leg frame member 32.

There is a pair of cross frame members 102, 104 which cross each other and interconnect the left and right sides of the device 10. Cross frame member 102 has its upper end pivotally mounted to the pivoting joint 34 for leg frame member 30 and has its bottom end pivotally mounted to the slidable sleeve 98 for leg frame member 32. Cross frame member 104 has its upper end pivotally mounted to the pivoting joint 36 for leg frame member 32 and has its bottom end pivotally mounted to the slidable sleeve for leg frame member 30. The cross frame members 102, 104 are interconnected where they cross each other by a pivot pin 106.

With the pivoting downwardly of the handle frame member 16 (together with handle frame member 14), the above described arrangement of frame members and pivot joints causes the sleeve 98 to slide down the leg frame member 32, taking with it the slide frame member 56. This, in turn, causes the rear linkage frame member 60 to move in such a way as to cause the rear support frame member 52 to pivot in a direction where it can ultimately align with the handle frame member 16. This sequence of movement (see FIGS. 6, 7, 8 and 9) results in alignment of the leg frame member 32, the slide frame member 56, the rear support frame member 52 and the handle frame member 16, and in the bringing closer together of the left and right sides of the device 10.

Figure 9:
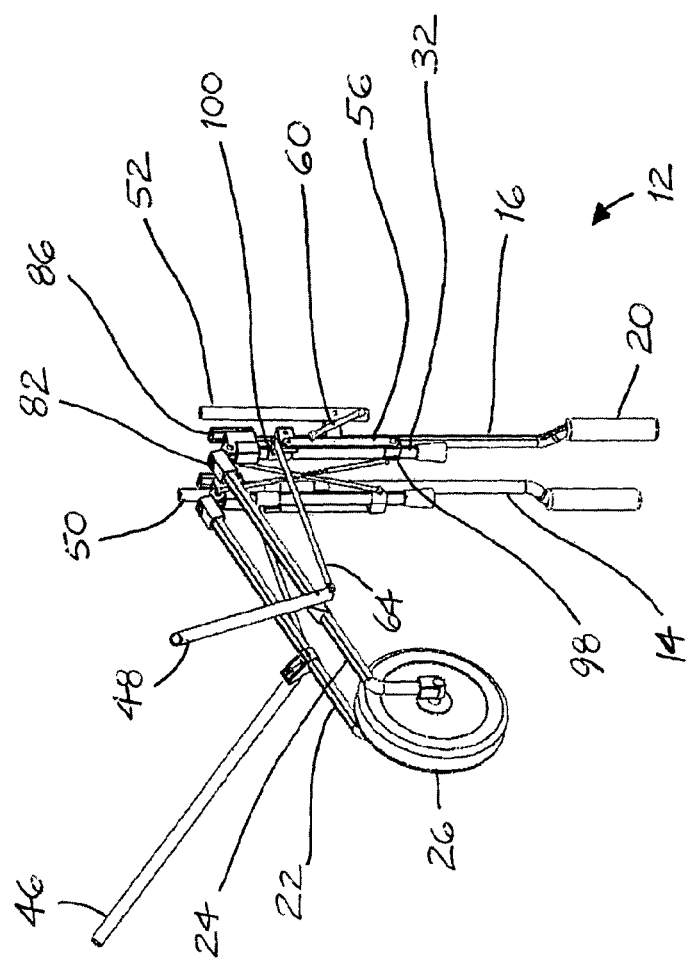
FIG. 9 is a perspective view similar to that of FIG. 8 but showing the frame, handle means and wheel means in a third state of being collapsed to a collapsed configuration.
Figure 10:
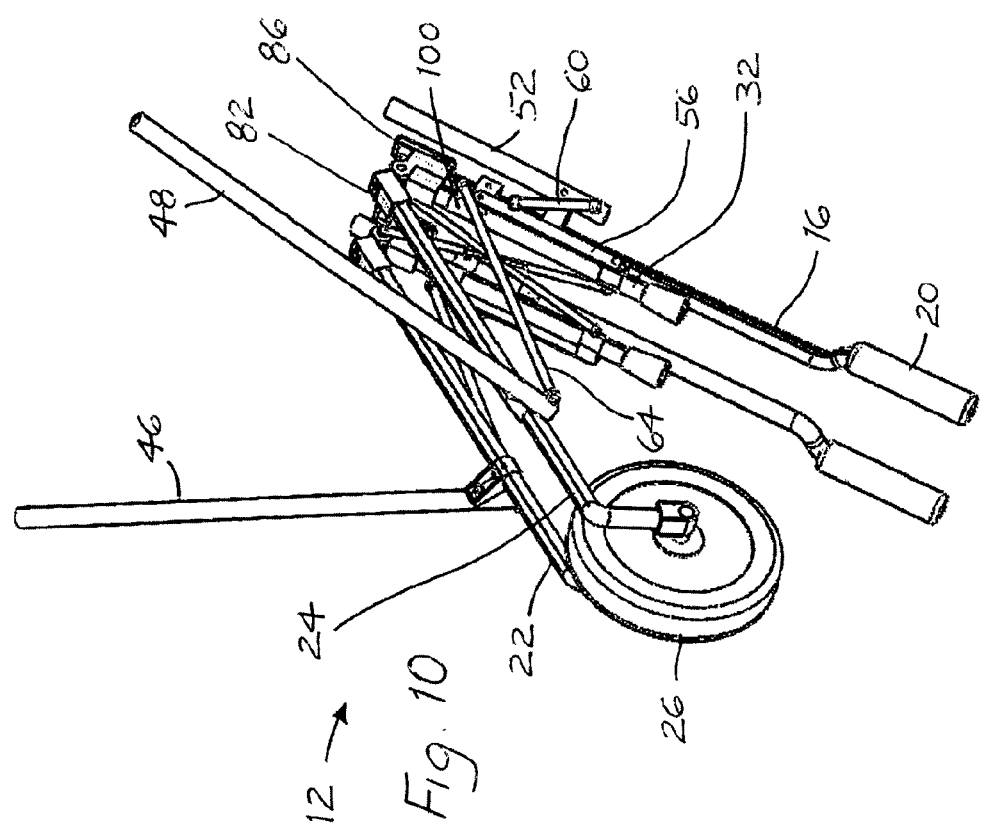
FIG. 10 is a perspective view similar to that of FIG. 9 but showing the frame, handle means and wheel means in a third state of being collapsed to a collapsed configuration.
Figure 11:
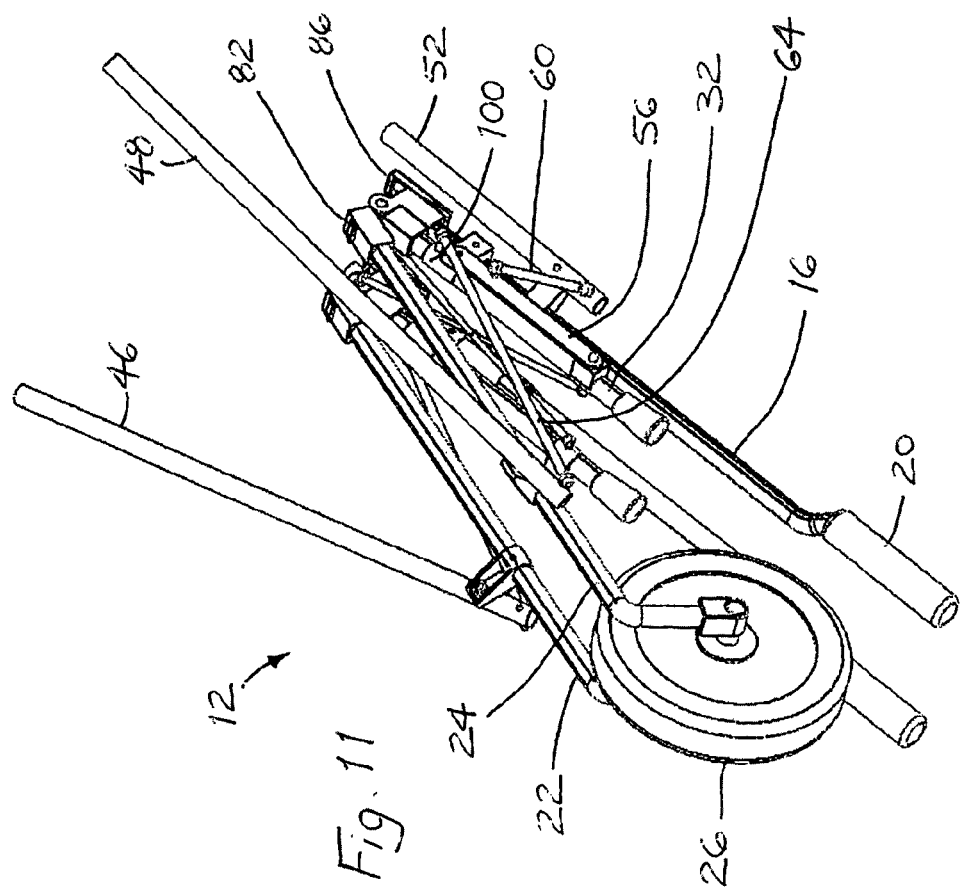
FIG. 11 is a perspective view similar to that of FIG. 10 but showing the frame, handle means and wheel means in a fourth state of being collapsed to a collapsed configuration.
Figure 12:
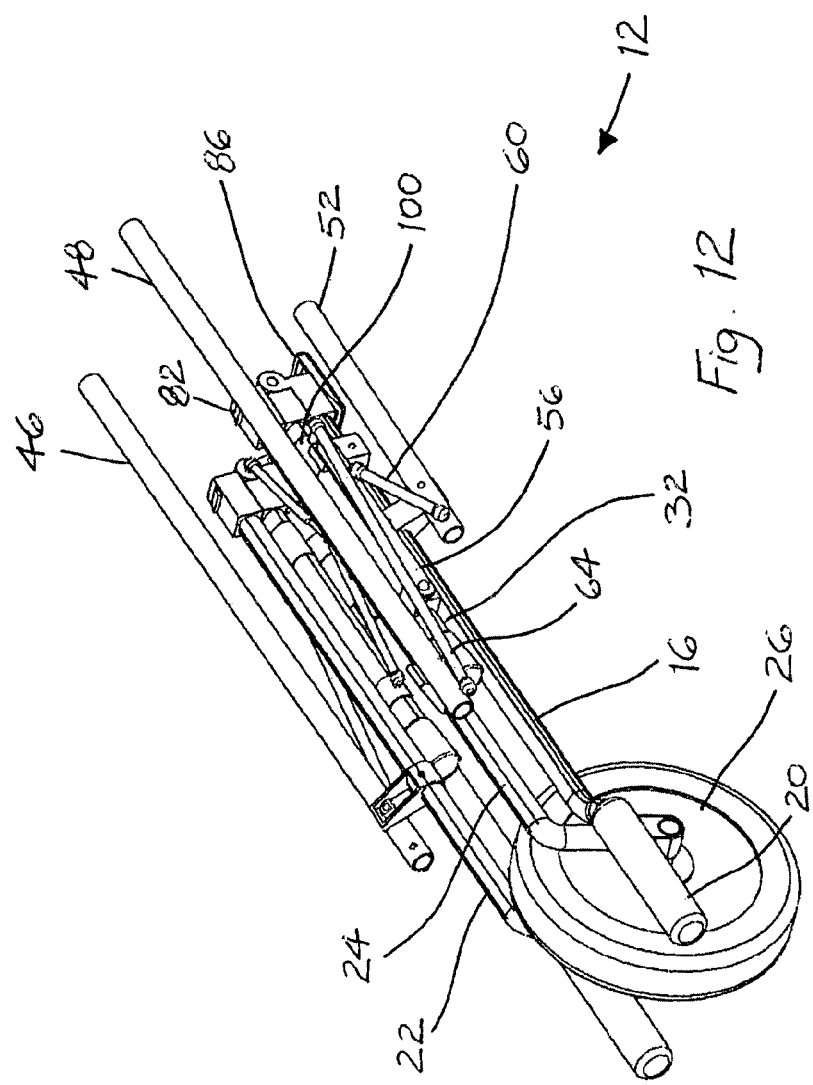
FIG. 12 is a perspective view similar to that of FIG. 11 but showing the frame, handle means and wheel means in a final state of being collapsed whereby the frame is in a collapsed configuration.
Figure 13:
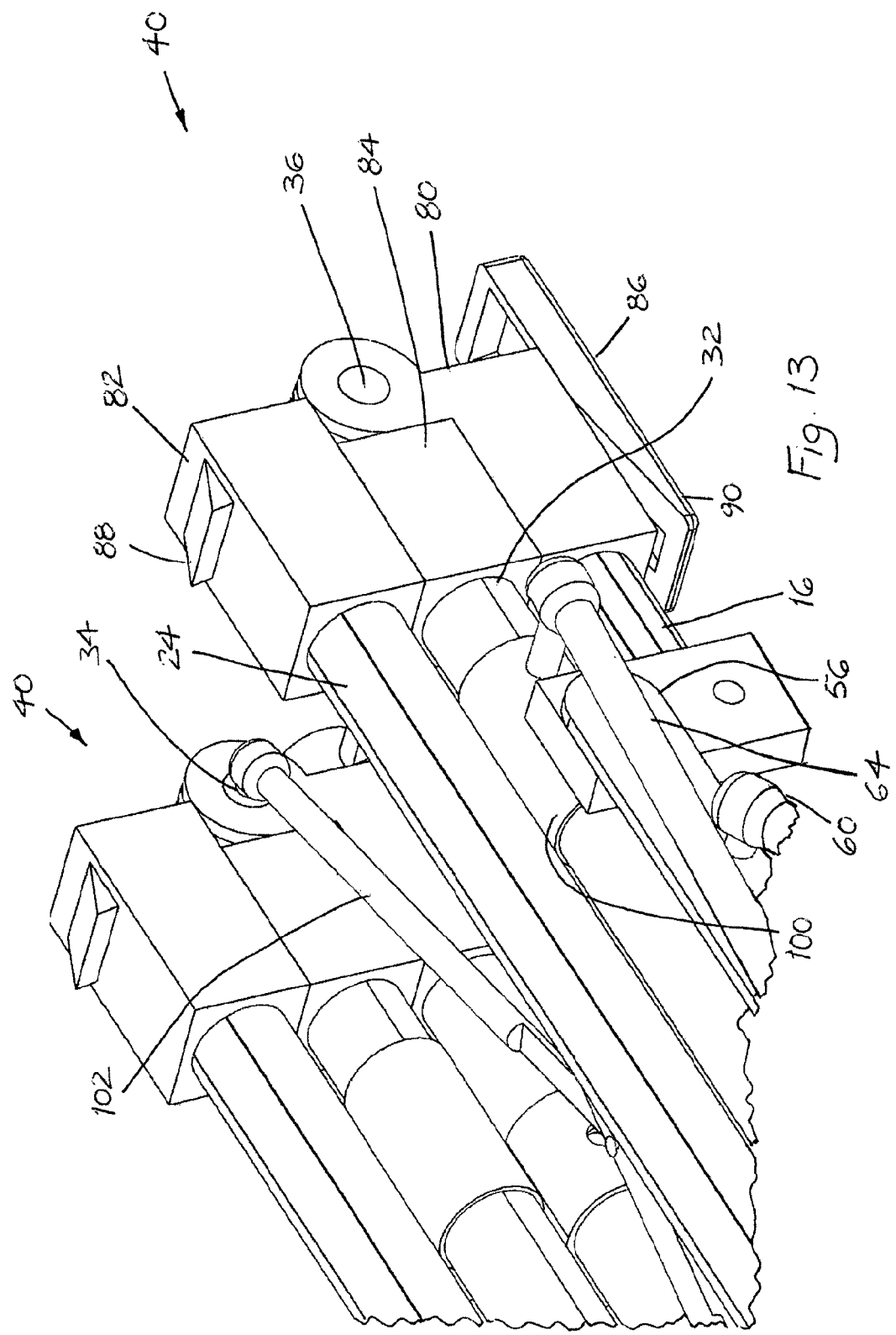
FIG. 13 is an enlarged perspective view of the frame portion shown in FIG. 7, but showing the unlocked latch arrangement when the frame is in the collapsed configuration.
Figure 14:
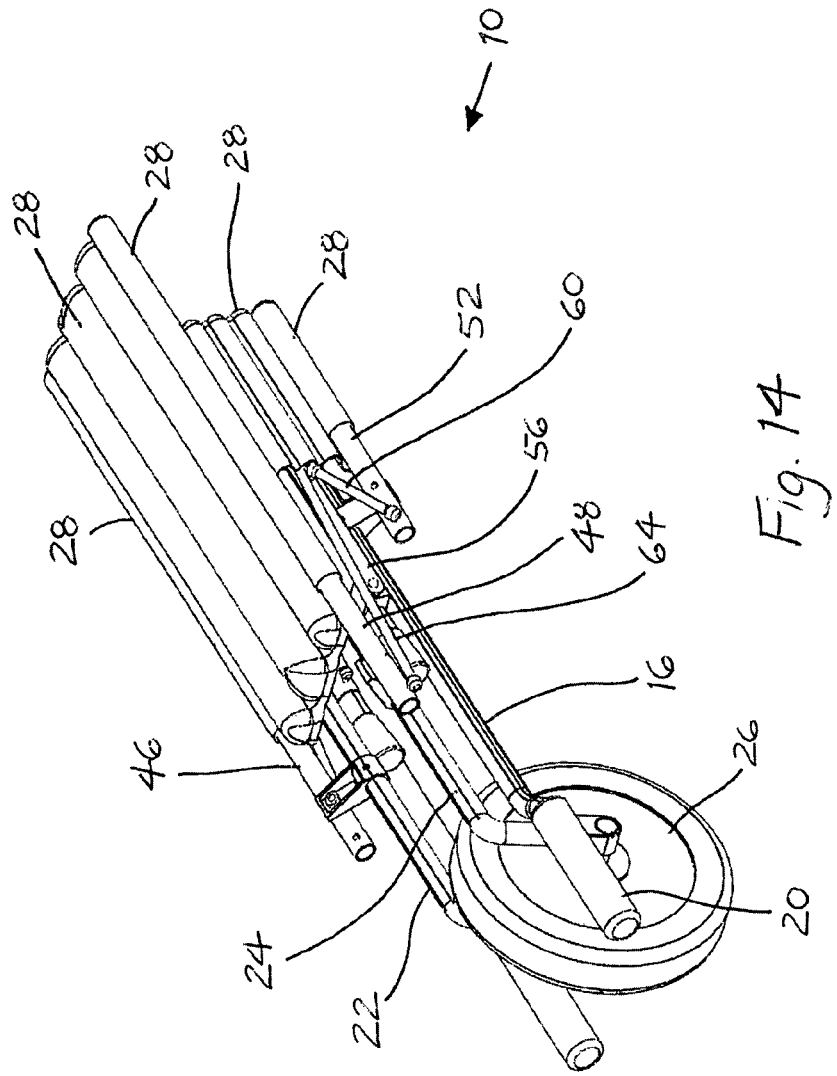
FIG. 14 is a perspective view similar to that of FIG. 12 but showing the supporting means when the frame is in the collapsed configuration.

The partly collapsed configuration shown in FIG. 9 can be further collapsed by pivoting the front support frame members 46, 48 towards their respective adjacent leg frame member 30, 32. FIGS. 9 to 14 show this sequence of movement. Referring to the right side of the device 10, this results in alignment of the front support frame member 48 with the main body frame member 24 and, because of the action of the front linkage frame member 64, those frame members 48, 24 become aligned with the leg frame member 32, the slide frame, member 56, the rear support frame member 52 and the handle frame member 16. FIG. 13, in particular, shows how the arrangement of the brackets 80, 82 and 84 and the location of the pivoting joint 36 facilitate the alignment of frame members in the collapsed configuration. The brackets 80, 82 and 84 have planar surfaces that align and abut each other, as shown in close up detail in FIG. 13, at the junction of the handle frame member 16, main body frame member 24 and leg frame member 32.

It will be readily apparent to persons skilled in the art that the expanding of the device 10, whereby the frame 12 moves from a collapsed configuration to an expanded configuration, will generally be the reverse of the above described collapsing process.

Figure 15:
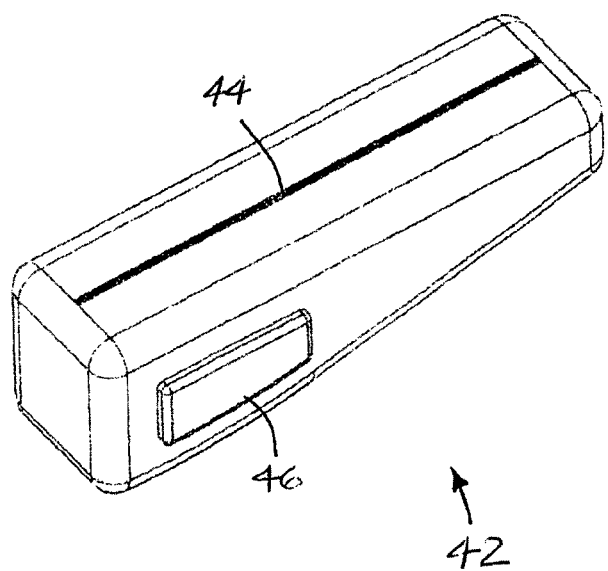
FIG. 15 is a perspective view of a carry bag in which a preferred convertible dual purpose device of the invention is stored when the frame is in the collapsed configuration.

With the frame 12 in the collapsed configuration, the device 10 can be stored in a carry bag 42 (see FIG. 15). The early bag 42 includes a zipper opening 44, a pocket 46 and a pair of opposed handle straps, and is about 800 mm to about 900 mm in length (or height) and about 150 mm to about 260 mm in width.

It will also be apparent to persons skilled in the art that the convertible dual purpose device of the invention may be made of many suitable materials that are relatively light weight and durable. It will also be apparent that the device may include additional items of convenience, such as a drinking cup holder or an umbrella support.

It will further be readily apparent from the above that there are various advantages of the present invention.

One advantage is that, by using the convertible dual purpose device of the present invention, a user is no longer confronted with a laborious and time consuming task of carrying items to an outdoor recreational event.

Another advantage is that a user can, after its use as a recreational wheel barrow, simply reposition the device in an orientation where it can be used as a chair, and vice versa.

A yet further advantage is that the device is compact, portable and collapsible for case of storage and transportation.

It will also be readily apparent to persons skilled in the art that various structural modifications may be made in details of design and construction of the embodiments of the convertible dual purpose device, and in the steps of collapsing and expanding the device described above, without departing from the scope or ambit of the present invention.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates before the filing date of this patent application.

The invention claimed is:

1. A convertible dual purpose device comprising:
   (a) a frame movable between an expanded configuration and a collapsed configuration,
   (b) supporting material connected to the frame for supporting one or more objects,
   (c) a pair of spaced apart handles at a first end of the frame, and
   (d) a wheel at a second end of the frame,
   wherein, when the frame is in the expanded configuration, the device is adapted to convert between a chair and a wheel barrow, such that the device can be positioned in a first orientation whereby the supporting material is adapted to serve as a load support of the chair, or in a second orientation whereby the supporting material is adapted to serve as a load support of the wheel barrow, and wherein, when the frame is in the collapsed configuration, the device can be stored in a carry bag,
   wherein the handles are located at the end of respective handle frame members which converge in the direction of the second end of the frame,
   wherein the handle frame members are pivotable with respect to a main portion of the frame when the frame is being moved between an expanded configuration and a collapsed configuration,
   each handle frame member is adapted to pivot downwardly about a respective pivoting joint when a co-operating latch arrangement is in an unlocked condition so as to allow the device to be collapsed to a collapsed configuration, and
   wherein the latch arrangement co-operates with a singular pivoting joint which provides a junction between the handle frame member, a main body frame member and a leg frame member, the singular pivoting joint provided at the junction being connected to each of a handle frame bracket, a body frame bracket and a leg frame bracket, whereby the said brackets can pivot relative to each other when the latch arrangement is in the unlocked condition.

2. The device of claim 1 wherein the supporting material comprises flexible and load bearing material that, when the device is in the first orientation, comfortably supports the weight of a person, and when the device is in the second orientation, stably supports the weight of the one or more objects when being pushed.

3. The device of claim 1 wherein the wheel is located posteriorly of a region of the supporting material adapted to support the torso of a person when the device is positioned in the first orientation.

4. The device of claim 1 wherein the handles comprise leg frame members which are adapted to engage the ground when the device is positioned in the first orientation.

5. The device of claim 1, wherein the latch arrangement comprises a latch lever pivotally mounted on the handle frame bracket, and a catch secured on the body frame bracket.

6. The device of claim 1, wherein the pivoting joint is connected to each of the brackets and allows the brackets to pivot relative to each other when the latch arrangement is in an unlocked condition, whereby planar surfaces of the brackets align and abut each other at the junction of the handle frame member, main body frame member and leg frame member.

* * * * *